Sept. 22, 1964     W. G. DARLAND, JR     3,150,008

GALVANIC BATTERY ELECTRODE

Filed March 6, 1962

INVENTOR.
WILLIAM G. DARLAND, Jr.

BY
ATTYS.

United States Patent Office 3,150,008
Patented Sept. 22, 1964

3,150,008
GALVANIC BATTERY ELECTRODE
William G. Darland, Jr., Cuyahoga County, Ohio, assignor, by mesne assignments, to the United States of America as represented by the Secretary of the Navy
Filed Mar. 6, 1962, Ser. No. 178,226
1 Claim. (Cl. 136—27)

This invention relates generally to an improved electrochemical battery of the deferred action type which contains a sealed electrolyte which is not applied to the cell electrodes until immediately before use. This invention more particularly relates to the treatment of the battery electrodes utilized in the reserve energizer such that the voltage rise time has been substantially reduced over a wide operating temperature range and the electrodes have greater resistance to the deteriorating effects of long term shelf storage.

In the field of the reserve energizers it has been the general practice to arrange the cells about a cavity in which is carried an electrolyte contained in an ampule. An entry port to each cell cavity opens along a fill channel within the cavity that contains the ampule. When the projectile is fired, the ampule is displaced from its supporting means and forced against a breaker platform with sufficient force to break the ampule and release the electrolyte therefrom. As the projectile leaves the muzzle of the gun the electrolyte is forced along a fill channel due to the centrifugal forces of the spinning shell. These forces vary with the spin rate of the projectile and force the electrolyte through the entry port of the individual cells thereby filling each cell of the battery. One of the problems of the prior art reserve energizers has been in bringing the reserve energizer to full voltage sufficiently quick enough so that it could be used to energize the projectile for low flying objects at all ranges of temperature. The voltage rise time of the prior art batteries has been very slow at the lower temperatures.

It requires a certain period of time for the electrolyte from the broken ampule to pass into the fill channel and into the individual cell cavities by way of their entry port. While the electrolyte is entering the individual cells the cells are subject to a short circuit through the flooding electrolyte. Upon completion of the cell filling and subsequent retraction of the electrolyte from the cell entry port almost completely eliminates the short circuit of the cells except for some residual wetting on the electroplate at the fill channel which may occur. It is customary in the prior art for the reserve energizers thereof to utilize a lead oxide on the battery terminals with an absorbic acid as the electrolyte. While this prior art reserve energizer has been able to operate over a moderate temperature range it still lacked the quick activation achieved by this invention.

The general purpose of this invention is to provide an electrochemical battery or reserve energizer for use in a spinning projectile that is capable of operating over a wide temperature range having a fast voltage rise time and to provide a battery that has an increased voltage lever per cell unit with a greater resistance to the deteriorating effects of long term shelf storage.

To attain this improvement in the reserve energizer the present invention contemplates a distinctly new variety of oxide of lead on one of the electrodes of the reserve energizer which serves as a depolarizer and will permit improved shelf storage life and a wider operating temperature range for the battery under service conditions. This invention utilizes a highly active form of $PbO_2$ which is lead oxide that is plated from a lead acetate plating bath as an overlay over a less active $PbO_2$ previously plated from a lead nitrate plating bath.

An object of this invention is to provide a new and improved electrochemical battery, or reserve energizer, for use as a power source in a proximity fuzing system within a spinning projectile.

Another object is to provide a force fill reserve energizer having a substantially decreased voltage rise time after activation.

A further object of this invention is to provide a battery or reserve energizer having a decreased voltage rise time with an increase in the voltage level per unit cell.

Still another object is to provide a reserve energizer that is capable of operation over a temperature range from a $-70°$ F. to $+160°$ F.

Yet another object of this invention is to provide a new and improved reserve energizer in which the electrode plates have a greater resistance to the deteriorating effects of long term shelf storage.

Still another object of the invention is to provide a new and improved ampule container that has a long term of resistance to the fluoboric acid contained therein.

Other objects and many of the attendant advantages of this invention will be readily apparent as the same becomes better understood by reference to the following detailed description when considered in connection with the accompanying drawings in which like numerals designate like parts throughout the figures thereof and wherein.

Figure 1:
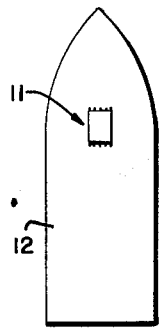
FIG. 1 illustrates a projectile in flight containing a reserve energizer employing the present invention.

There is illustrated in FIG. 1 a spin projectile 12 within which is contained an electrochemical battery or reserve energizer 11 of cylindrical configuration. The axis of the reserve energizer is coincident with the spin axis of projectile 12.

Within the projectile 12, but not shown, is a proximity fuzing system or other electrical equipment requiring a suitable source of power of the type herein disclosed.

Figure 2:
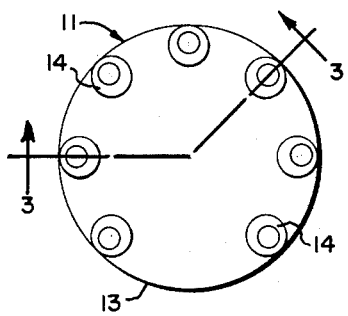
FIG. 2 is a plan view of a preferred embodiment of this invention.

FIG. 2 illustrates a plan view of the reserve energizer of FIG. 1 and comprises a battery case 13 on which a plurality of castellated terminal means 14 are provided to make suitable connections to the electrical equipment contained within the projectile. The connector means may be of any suitable type such for example, as plug-in type connectors.

Figure 3:
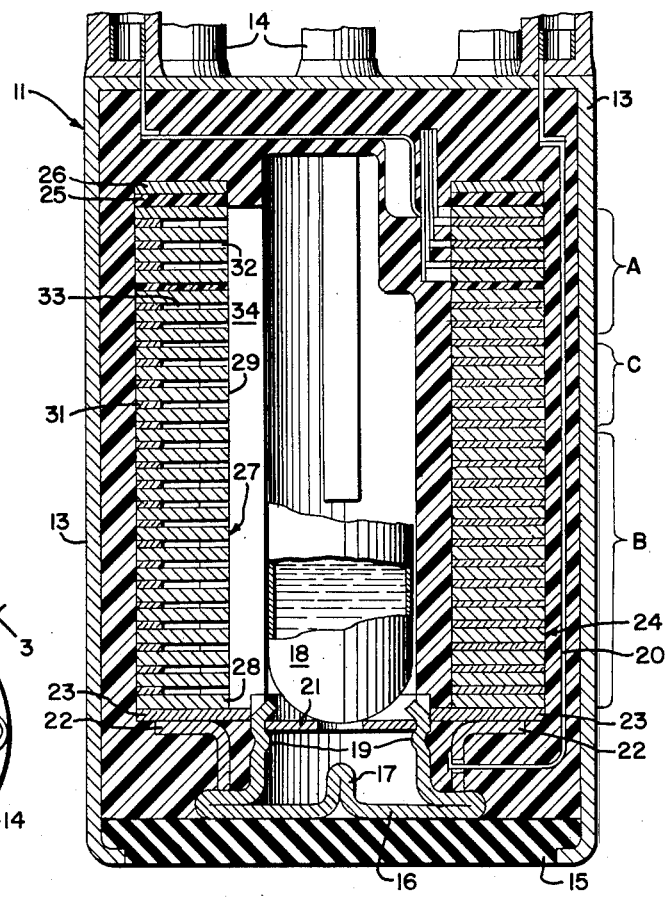
FIG. 3 is an enlarged section of the device taken along line 3—3 of FIG. 2.

The section of FIG. 3 is taken along line 3—3 of FIG. 3 and illustrates the battery or reserve energizer in greater detail.

There is illustrated in FIG. 3 a battery case 13 and a base member 15 composed of any suitable molding compound. A breaker platform 16 is supported by the base member 15 and has an irregular shaped breaker 17 for securing complete fragmentation of ampule 18 holding the fluoboric acid electrolyte contained therein as will hereinafter be described.

Breaker platform 16 also has a plurality of dimple contacts 19 which project slightly inward therefrom and hold ampule supporting disc 21 or any other suitable supporting means in position above surface of the platform. Dimple contacts 19 and the ampule support disc 21 are so arranged that the frictional force therebetween are sufficient to maintain the ampule supported above the breaker platform during normal handling and shipping of the device but insufficient to support the ampule under the setback forces which occur on firing of the projectile from a gun.

The electrolyte is sealed in a Pyrex glass ampule which is inert to the etching generally accompanying the storage of fluoboric acid. This insures that the ampule is capable of long term storage.

Abutting the breaker platform 16 is a stack support 22 with a cell support disc 23 thereon. The breaker platform 16, the cell support 22, and cell support disc 23 are each constructed of steel or other suitable electrical conducting material with a nickel flashing thereon to insure good electrical contact therebetween since this will be the contact for the B+ voltage of the battery. A lead 20 is welded either to the cell support disc 23 or the cell support 22 and extended up through the encapsulating material to the connecting plugs 14.

Supported by cell support disc 23 are a plurality of cells 24 which are connected in series or in parallel depending upon the desired voltage.

Adjacent the upper cell as viewed in FIG. 3 is an insulating washer 25 composed of Vinylite or other suitable insulating material and a stack height adjusting device 26 such as a steel washer for adjusting the overall height of the energizer.

Figure 4:
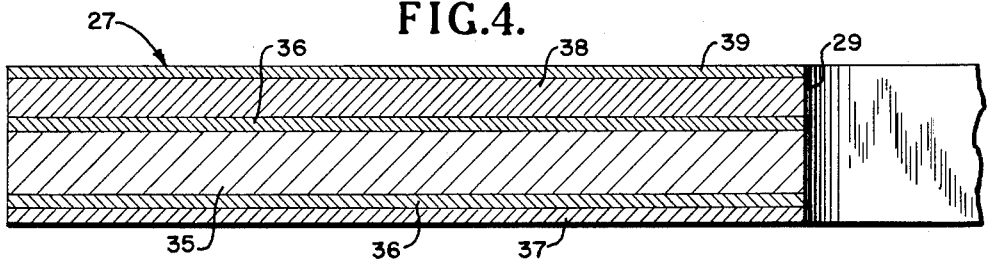
FIG. 4 is a greatly enlarged section of one of the battery electrodes illustrating the active material on the electrode.

The battery 11 utilizes annular shaped plates 27 which are stacked at a right angle to the unit axis. The first plate 28 is coated with a nickel surface on the side abutting the cell support disc 23 and a lead dioxide coating on the other surface thereof. The annular shaped plates 27 are made of a shim steel stock which is covered with a nickel flashing. One side of the plate is electrodeposited with a coating of lead and the other side is electrodeposited with a coating of lead oxide from a nitrate bath with an overlay of lead oxide from an acetate bath as shown in FIG. 4. The battery plates are stacked in the B and C sections of the battery in such a manner as to place the lead coated surface of one plate facing the lead oxide coating of the next adjacent plate.

If, however, the cells are to be connected in parallel, such as in the A section, alternate plates will be connected together and coating over both surfaces with lead and the intermediate plates will be connected together and coated over both surfaces with lead oxide, from a nitrate bath with an overlay of lead oxide from an acetate bath. The annular shaped plates 27 have an aligned scallop 29 along the inner diameter thereof. Interposed between each pair of plates 27 is a paper separator 31 having an entry port 32 which is connected to a cell channel 33. The entry port 32 of each paper separator 31 is registered with the scallop 29 of each of plates 27, such that, the scallops 29 and the open segments through the separator 31 are aligned to form a fill channel 34 which opens through the separator entry port 32 into each individual cell. The basic stack consists of 58 cells series connected in the B section and will supply approximately 110 volts in operation. In some applications, a mid voltage tap is required. A tap plate, therefore, may be inserted in the appropriate cell as viewed in FIG. 3 of the B section having a tab located in a channel 180° from the fill channel. Above the B section is located a four cell, series connected, C section over which is positioned a reinforced insulating barrier. On top of this is placed an eight or ten cell, parallel connected, A section. The necessary electrical contacts on the series and parallel connected plates with the exception of the B+ end of the stack, are made through the use of tab plates and are connected to a plug-in connector. The stack is encapsulated in an elastomer molding compound except for the fill channel. For this purpose an elastomer, Vinylite, base molding compound is compatible with the electrode coatings and may be utilized. The stack itself is encapsulated in two operations, the first being an outside molding of the stack, the second being a potting operation to form the ampule cavity housing and stack liner. The electrolyte is sealed in a Pyrex glass ampule and inserted in the ampule cavity. To insure proper breakage of the ampule, a special ampule breaker has been designed to assist in fragmentation and yet supply enough cushioning effect to prevent ampule breakage if the battery is accidentally dropped.

Referring now to FIG. 4, which is an illustration of a typical electrode in the B and C sections. The electrode is basically made from a steel shim 35 which has a nickel flashing 36 on each of the flat surfaces. The nickel provides a better plating surface than the steel alone. On one side of the washer is plated a lead coating 37 and the other side has a lead oxide coating 38 from a nitrate bath. A thin plating of lead oxide 39 from an acetate bath is plated over the lead oxide from the nitrate bath. This distinct new variety of oxide of lead serves as a depolarizer in the reserve energizer and will permit improved shelf storage life and a wider operating temperature range for the battery under service conditions. It has been discovered that the lead oxide from the acetate bath is a very highly active form of the material and as an overlay upon the less active lead oxide from the nitrate bath provides substantial advantage which were heretofore unknown.

The operation of the reserve energizer must be adequate at a high temperature as well as at a low temperature. For example, the operating temperature as specified by the military requirements range from −65° F. to +160° F. The voltage behavior of the energizer utilizing the depolarizer compared with an energizer that utilizes only the nitrate lead oxide in the A and B sections is indicated in the following tables. The greatest voltage improvement occurs in the low temperature range within which the energizer will be subjected during actual operation. As is indicated in the tables the upper voltage limit of the B section was maintained at approximately 110 volts and the number of B cells in the energizer with the acetate $PbO_2$ was reduced from 62 to 58 without sacrificing any loss of voltage at the lower temperatures. Thus, it can be seen that new and improved reserve energizer operates at a greater efficiency at all temperatures.

*Table I*

EFFECT OF TEMPERATURE ON VOLTAGE CHARACTERISTICS OF ACETATE VS. NITRATE TYPE $PbO_2$ IN "A" SECTION

| Test temperature in ° F. | "A" section voltage at 0.5 second | |
|---|---|---|
| | Acetate $PbO_2$ | Nitrate $PbO_2$ |
| +160 | 1.87 | 1.73 |
| +130 | 1.84 | 1.73 |
| +75 | 1.80 | 1.66 |
| +10 | 1.67 | 1.44 |
| −20 | 1.58 | 1.32 |
| −40 | 1.45 | 1.23 |
| −60 | 1.34 | 1.06 |
| −70 | 1.25 | .98 |

*Table II*

EFFECT OF TEMPERATURE ON VOLTAGE CHARACTERISTICS OF ACETATE VS. NITRATE TYPE $PbO_2$ IN "B" SECTION

| Test temperature | "B" section voltage at 0.5 second | | | |
|---|---|---|---|---|
| | 58 cells acetate $PbO_2$ | Unit cell voltage | 62 cells nitrate $PbO_2$ | Unit cell voltage |
| +160 | 109 | 1.88 | 111 | 1.79 |
| +130 | 108 | 1.86 | 109 | 1.76 |
| +75 | 106 | 1.83 | 108 | 1.74 |
| +10 | 100 | 1.72 | 98 | 1.58 |
| −20 | 95 | 1.63 | 91 | 1.48 |
| −40 | 90 | 1.55 | 85 | 1.37 |
| −60 | 83 | 1.43 | 73 | 1.10 |
| −70 | 77 | 1.33 | 69 | 1.18 |

The effect of the invention on the continuous storage of the reserve energizers at 130° F. followed by spin tests at −40° F. on the energizer activation time and maximum voltage is shown in the following tables III and IV.

Table III

STORAGE LIFE VS. ACTIVATION TIME—HIGH TEMPERATURE STORAGE OF ACETATE PbO₂ AND ACETATE-NITRATE PbO₂ TYPE ENERGIZERS.

| Test temperature storage period | Time in seconds | | | | | |
|---|---|---|---|---|---|---|
| | −40° F. | | | −40° F. | | |
| | A | B | C | A | B | C |
| Initial | .22 | .18 | .02 | .09 | .19 | .05 |
| 3 wks | .26 | .20 | .08 | .17 | .29 | .08 |
| 6 wks | .41 | .43 | .09 | .22 | 3.62 | .18 |
| 9 wks | | | | .18 | 3.55 | .20 |
| 12 wks | .43 | .39 | .10 | .19 | 2.52 | .17 |
| 24 wks | | | | .41 | 12.00 | .41 |
| 6 months | .54 | .55 | .24 | | | |
| 9 months | | | | .52 | 9.18 | .38 |
| 1 yr | .68 | .28 | .16 | .52 | 20.25 | .53 |
| PbO₂ type | Acetate | Acetate | Acetate | Acetate | Nitrate | Nitrate |

Cutoff voltage: "A" section, 1.1 volts; "B" section, 75 volts; "C" section, 4.5 volts.

Table IV

STORAGE LIFE VS. MAXIMUM VOLTAGE

| 130° test temperature storage period | Sections at −40° F. | | | Sections at −40° F. | | |
|---|---|---|---|---|---|---|
| | A | B | C | A | B | C |
| Initial | 1.39 | 97 | 7.05 | 1.46 | 95 | 6.83 |
| 3 wks | 1.41 | 98 | 6.95 | 1.46 | 94 | 6.75 |
| 6 wks | 1.39 | 96 | 7.15 | 1.47 | 96 | 6.46 |
| 9 wks | | | | 1.5 | 96 | 6.68 |
| 12 wks | 1.44 | 95 | 7.23 | 1.55 | 94 | 6.46 |
| 24 wks | | | | 1.39 | 92 | 6.41 |
| 6 months | 1.54 | 95 | 7.17 | | | |
| 9 months | | | | 1.46 | 93 | 6.58 |
| 1 yr | 1.43 | 97 | 6.65 | 1.42 | 91 | 6.30 |
| PbO₂ type | Acetate | Acetate | Acetate | Acetate | Nitrate | Nitrate |

Lot 1 was assembled with the acetate lead oxide plate stock and Lot 2 (except for its A section) was assembled with only the nitrate lead oxide stock. The marked superiority of the acetate lead oxide stock is obvious by comparison of the activation and voltage data for the two B sections. Continuous storage at 130° F. is used as an accelerated storage test and it is estimated that three to six weeks' continuous storage at this temperature is equivalent to nearly two years of normal ambient temperature storage. Thus, it can be seen that as a result of using the acetate lead oxide coating the voltage rise time is faster after a prolonged storage than it is initially for the nitrate lead oxide used in the batteries heretofore. Thus, this invention has provided a greater resistance to the deteriorating effects of long term shelf storage.

There has been shown and described herein a battery or reserve energizer for a proximity fuze system or other electrical equipment contained within a projectile which provides a new and unique construction of the energizer cells that are capable of a fast voltage rise time even after it has been stored on the shelf for long periods of time. The construction also provides for an increased voltage level per unit cell over a wider operating temperature range for the energizer or battery which provides for greater efficiency for each cell thereby allowing a battery of smaller dimensions to be installed while maintaining the same voltage. Since the proximity fuze has become more and more complex, a reduction in the size of the battery is considered a significant step forward in the art.

Obviously many modifications and variations of the present invention are possible in the light of the above teachings. It is therefore to be understood, that within the scope of the appended claim, the invention may be practiced otherwise than as specifically described.

What is claimed as new and desired to be secured by Letters Patent of the United States is:

A method of forming a lead oxide coating on certain surfaces of stacked plates which form the series and parallel connected cells of a spin activated battery comprising the steps of:

depositing on said surfaces a first layer of lead oxide plated in a nitrate bath and having a first state of activation and depositing on said first layer a second layer of lead oxide plated in an acetate bath and having a higher state of activation than said first layer of lead oxide.

References Cited in the file of this patent

UNITED STATES PATENTS

| | | |
|---|---|---|
| 2,981,778 | Freund | Apr. 25, 1961 |
| 2,981,779 | Freund | Apr. 25, 1961 |
| 2,985,702 | Darland et al. | May 23, 1961 |
| 2,990,441 | Marsal | June 27, 1961 |
| 2,990,442 | Barnett | June 27, 1961 |
| 2,996,564 | Morton | Aug. 15, 1961 |
| 3,003,016 | Marsal | Oct. 3, 1961 |
| 3,003,908 | Darland | May 8, 1962 |

OTHER REFERENCES

The Electrochemical Society, vol. 90, pages 405–417, 1946.